(12) United States Patent
Sullivan et al.

(10) Patent No.: US 6,561,927 B1
(45) Date of Patent: May 13, 2003

(54) METHODS OF MAKING LOW SPIN GOLF BALL UTILIZING A MANTLE AND A CELLULAR OR LIQUID CORE

(75) Inventors: Michael J. Sullivan, Chicopee, MA (US); R. Dennis Nesbitt, Westfield, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/709,988

(22) Filed: Nov. 9, 2000

Related U.S. Application Data

(63) Continuation of application No. 09/248,856, filed on Feb. 11, 1999, now Pat. No. 6,193,618, and a continuation-in-part of application No. 08/969,083, filed on Nov. 12, 1997, now Pat. No. 6,244,977, which is a continuation-in-part of application No. 08/716,016, filed on Sep. 19, 1996, now Pat. No. 5,820,489, and a continuation-in-part of application No. 08/714,661, filed on Sep. 16, 1996, now Pat. No. 6,368,237, which is a division of application No. 08/255,442, filed on Jun. 8, 1994, now abandoned, which is a continuation of application No. 08/054,406, filed on Apr. 28, 1993, now Pat. No. 5,368,304.

(60) Provisional application No. 60/042,430, filed on Mar. 28, 1997, and provisional application No. 60/042,120, filed on Mar. 28, 1997.

(51) Int. Cl.[7] ............................................. A63G 37/06
(52) U.S. Cl. ...................... 473/373; 473/354; 473/375; 156/146
(58) Field of Search .............................. 473/409, 354, 473/373, 374, 367, 368, 370, 371, 372, 375, 376

(56) References Cited

U.S. PATENT DOCUMENTS

| | | |
|---|---|---|
| 696,887 A | 4/1902 | Kempshall |
| 696,890 A | 4/1902 | Kempshall |
| 696,891 A | 4/1902 | Kempshall |
| 696,895 A | 4/1902 | Kempshall |

(List continued on next page.)

FOREIGN PATENT DOCUMENTS

| | | |
|---|---|---|
| AU | 192618 | 1/1983 |
| GB | 189551 | 9/1921 |
| GB | 377354 | 5/1931 |
| GB | 420410 | 1/1934 |
| GB | 2230531 | 10/1990 |
| GB | 2 260 546 A | 4/1993 |
| GB | 2 278 609 A | 12/1994 |
| GB | 2 291 811 A | 2/1996 |
| GB | 2 291 812 A | 2/1996 |
| GB | 2260546 | 5/1996 |
| GB | 2 299 999 A | 10/1996 |
| WO | WO 02509 | 11/1980 |

OTHER PUBLICATIONS

Du Pont—Surlyn Grade Selector Guide (1985).

"The Curious History of the Golf ball, Mankind's Most Fascinating Sphere," John Stuart Martin, Horizon Press, N.Y. 1968. See pp. 88 and 89.

*Primary Examiner*—Mark S. Graham
*Assistant Examiner*—Raeann Gorden

(57) ABSTRACT

The present invention is directed to a golf ball comprising a soft core and a hard cover to produce a resulting molded golf ball having a reduced spin rate. The golf ball comprises one or more metal mantle layers and a cellular or liquid core component. The golf ball may also comprise an optional polymeric spherical substrate inwardly disposed relative to the one or more metal mantle layers. The golf ball of the present invention may also utilize an enlarged diameter which serves to further reduce spin rate. The resulting golf ball exhibits properties of reduced spin without sacrificing durability, playability and resilience.

17 Claims, 4 Drawing Sheets

U.S. PATENT DOCUMENTS

| | | | |
|---|---|---|---|
| 697,816 A | 4/1902 | Davis | |
| 697,925 A | 4/1902 | Kempshall | |
| 698,088 A | 4/1902 | Kempshall | |
| 699,089 A | 4/1902 | Kempshall | |
| 700,655 A | 5/1902 | Kempshall | |
| 700,656 A | 5/1902 | Kempshall | |
| 700,657 A | 5/1902 | Kempshall | |
| 700,658 A | 5/1902 | Kempshall | |
| 700,660 A | 5/1902 | Kempshall | |
| 701,741 A | 6/1902 | Kempshall | |
| 704,748 A | 7/1902 | Kempshall | |
| 704,838 A | 7/1902 | Kempshall | |
| 705,249 A | 7/1902 | Kempshall | |
| 705,359 A | 7/1902 | Kempshall | |
| 707,263 A | 8/1902 | Saunders | |
| 711,177 A | 10/1902 | Richards | |
| 711,227 A | 10/1902 | Richards | |
| 711,474 A | 10/1902 | Chapman | |
| 712,413 A | 10/1902 | Richards | |
| 713,772 A | 11/1902 | Kempshall | |
| 719,499 A | 2/1903 | Painter | |
| 720,852 A | 2/1903 | Smith, Jr. | |
| 727,200 A | 5/1903 | Richards | |
| 739,753 A | 9/1903 | Kempshall | |
| 740,403 A | 10/1903 | Day | |
| 878,254 A | 2/1908 | Taylor | |
| 906,644 A | 12/1908 | Meade | |
| 906,932 A | 12/1908 | Riblet | |
| 923,773 A | 5/1909 | Kempshall | |
| 985,741 A | 2/1911 | Harvey | |
| 1,182,605 A * | 5/1916 | Wadsworth | 473/373 |
| 1,182,604 A | 9/1916 | Wadsworth | |
| 1,255,388 A | 2/1918 | Cobb | |
| 1,270,008 A | 6/1918 | Cobb | |
| 1,265,036 A | 7/1918 | Bendelow | |
| 1,286,834 A | 12/1918 | Taylor | |
| 1,339,992 A | 5/1920 | Wais | |
| 1,418,220 A | 5/1922 | White | |
| 1,482,232 A | 1/1924 | Hazeltine | |
| 1,568,514 A * | 1/1926 | Lewis | 473/372 |
| 1,586,514 A | 6/1926 | Arnott | |
| 1,591,117 A | 7/1926 | Floyd | |
| 1,656,408 A | 1/1928 | Young | |
| 1,666,699 A | 4/1928 | Hagen | |
| 1,681,167 A | 8/1928 | Beldam | |
| 1,716,435 A | 6/1929 | Fotheringham | |
| 1,885,448 A | 4/1932 | Hazeltine | |
| 2,002,726 A | 5/1935 | Young | |
| 2,055,326 A | 9/1936 | Young | |
| D107,066 S | 11/1937 | Cavignac | |
| 2,106,704 A | 2/1938 | Davis | |
| 2,258,331 A | 10/1941 | Miller | |
| 2,258,332 A | 10/1941 | Miller | |
| 2,258,333 A | 10/1941 | Miller | |
| 2,364,955 A | 12/1944 | Diddel | |
| 2,643,125 A | 6/1953 | Juve | |
| 2,728,576 A | 12/1955 | Martin et al. | |
| 2,730,159 A | 1/1956 | Semegen | |
| 2,741,480 A | 4/1956 | Smith | |
| 2,786,684 A | 3/1957 | Muccino | |
| 2,861,810 A | 11/1958 | Veatch | |
| 2,997,302 A | 8/1961 | Smith | |
| 3,031,194 A | 4/1962 | Strayer | |
| RE25,427 E | 7/1963 | Harkins | |
| 3,218,075 A | 11/1965 | Shakespeare | |
| 3,264,272 A | 8/1966 | Rees | |
| 3,534,965 A | 10/1970 | Harrison et al. | |
| 3,572,721 A | 3/1971 | Harrison et al. | |
| 3,572,722 A | 3/1971 | Harrison et al. | |
| 3,671,477 A | 6/1972 | Nesbitt | |
| 3,708,172 A | 1/1973 | Rango | |
| D228,394 S | 9/1973 | Martin et al. | |
| 3,819,190 A | 6/1974 | Nepela et al. | |
| 3,819,768 A | 6/1974 | Molitor | |
| 3,908,993 A | 9/1975 | Gentiluomo | |
| 3,940,145 A | 2/1976 | Gentiluomo | |
| D243,866 S | 3/1977 | Shaw et al. | |
| D247,685 S | 4/1978 | Haines et al. | |
| 4,085,937 A | 4/1978 | Schenk | |
| 4,090,716 A | 5/1978 | Martin et al. | |
| 4,123,061 A | 10/1978 | Dusbiber | |
| 4,141,559 A | 2/1979 | Melvin et al. | |
| 4,142,727 A | 3/1979 | Shaw et al. | |
| 4,201,384 A | 5/1980 | Barber | |
| 4,234,184 A * | 11/1980 | Deleens et al. | 473/378 |
| 4,235,441 A | 11/1980 | Ciccarello | |
| 4,256,304 A | 3/1981 | Smith et al. | |
| 4,258,921 A | 3/1981 | Worst | |
| 4,266,773 A | 5/1981 | Treadwell | |
| 4,274,637 A | 6/1981 | Molitor | |
| 4,284,276 A | 8/1981 | Worst | |
| 4,302,311 A * | 11/1981 | Lowe et al. | 204/298 |
| 4,346,898 A | 8/1982 | Badke | |
| 4,431,193 A | 2/1984 | Nesbitt | |
| 4,483,537 A | 11/1984 | Hanada et al. | |
| 4,546,980 A | 10/1985 | Gendrea et al. | |
| 4,560,168 A | 12/1985 | Aoyama | |
| 4,625,964 A | 12/1986 | Yamada | |
| 4,653,758 A | 3/1987 | Solheim | |
| 4,660,834 A | 4/1987 | Carrigan | |
| 4,674,751 A | 6/1987 | Molitor et al. | |
| 4,679,795 A | 7/1987 | Melvin et al. | |
| 4,681,323 A | 7/1987 | Alaki et al. | |
| 4,714,253 A | 12/1987 | Nakahara et al. | |
| 4,720,111 A | 1/1988 | Yamada | |
| 4,722,529 A | 2/1988 | Shaw et al. | |
| 4,726,590 A | 2/1988 | Molitor | |
| 4,729,567 A | 3/1988 | Oka et al. | |
| 4,729,861 A | 3/1988 | Lynch et al. | |
| 4,744,564 A | 5/1988 | Yamada | |
| 4,762,326 A | 8/1988 | Gobush | |
| 4,765,626 A | 8/1988 | Gobush | |
| 4,770,422 A | 9/1988 | Isaac | |
| 4,772,026 A | 9/1988 | Gobush | |
| 4,787,638 A | 11/1988 | Kobayashi | |
| 4,801,649 A | 1/1989 | Statz | |
| 4,804,189 A | 2/1989 | Gobush | |
| 4,805,914 A | 2/1989 | Toland | |
| 4,813,677 A | 3/1989 | Oka et al. | |
| 4,830,378 A | 5/1989 | Aoyama | |
| 4,836,552 A | 6/1989 | Puckett et al. | |
| 4,839,116 A | 6/1989 | Puckett et al. | |
| 4,840,381 A | 6/1989 | Ihara et al. | |
| 4,844,471 A | 7/1989 | Terence et al. | |
| 4,844,472 A | 7/1989 | Ihara | |
| 4,848,766 A | 7/1989 | Oka et al. | |
| 4,848,770 A | 7/1989 | Shama | |
| 4,852,884 A | 8/1989 | Sullivan | |
| 4,858,923 A | 8/1989 | Gobush et al. | |
| 4,863,167 A | 9/1989 | Matsuki et al. | |
| 4,867,459 A | 9/1989 | Ihara | |
| 4,869,512 A | 9/1989 | Nomura et al. | |
| 4,877,252 A | 10/1989 | Shaw | |
| 4,880,241 A | 11/1989 | Melvin et al | |
| 4,884,814 A | 12/1989 | Sullivan | |
| 4,886,275 A | 12/1989 | Walker | |
| 4,886,277 A | 12/1989 | Mackey | |
| 4,911,451 A | 3/1990 | Sullivan et al. | |
| 4,915,389 A | 4/1990 | Ihara | |
| 4,915,390 A | 4/1990 | Gobush et al. | |
| 4,919,434 A | 4/1990 | Saito | |

| | | | | | | |
|---|---|---|---|---|---|---|
| 4,921,255 A | 5/1990 | Taylor | | 5,078,402 A | 1/1992 | Oka |
| 4,925,193 A | 5/1990 | Melvin et al. | | 5,080,367 A | 1/1992 | Lynch et al. |
| 4,932,664 A | 6/1990 | Pocklington et al. | | 5,098,105 A | 3/1992 | Sullivan |
| 4,936,587 A | 6/1990 | Lynch et al. | | 5,120,891 A | 6/1992 | Sullivan |
| 4,943,055 A | 7/1990 | Corley | | 5,150,905 A | 9/1992 | Yuki et al. |
| 4,949,976 A | 8/1990 | Gobush | | 5,150,906 A | 9/1992 | Molitor et al. |
| 4,960,283 A | 10/1990 | Gobush | | 5,184,828 A | 2/1993 | Kim et al. |
| 4,968,038 A | 11/1990 | Yamada | | 5,187,013 A | 2/1993 | Sullivan |
| 4,971,330 A | 11/1990 | Morell | | 5,194,191 A | 3/1993 | Nomura et al. |
| 4,973,057 A | 11/1990 | Morell | | 5,209,485 A | 5/1993 | Nesbitt et al. |
| 4,974,853 A | 12/1990 | Morell | | 5,222,739 A | 6/1993 | Horiuchi et al. |
| 4,974,854 A | 12/1990 | Morell | | 5,253,871 A | 10/1993 | Viollaz |
| 4,974,855 A | 12/1990 | Morell | | 5,273,286 A | 12/1993 | Sun |
| 4,974,856 A | 12/1990 | Morell | | 5,273,287 A | 12/1993 | Rees |
| 4,979,747 A | 12/1990 | Jonkouski | | 5,298,571 A | 3/1994 | Statz et al. |
| 4,982,964 A | 1/1991 | Morell | | 5,304,608 A | 4/1994 | Yabuki et al. |
| 4,986,545 A | 1/1991 | Sullivan | | 5,314,187 A | 5/1994 | Proudfit |
| 4,991,852 A | 2/1991 | Pattison | | 5,368,304 A | 11/1994 | Sullivan et al. |
| 4,995,613 A | 2/1991 | Walker | | 5,421,580 A | 6/1995 | Sugimoto et al. |
| 4,998,733 A | 3/1991 | Lee | | 5,439,227 A | 8/1995 | Egashira et al. |
| 5,000,459 A | 3/1991 | Isaac | | 5,452,898 A | 9/1995 | Yamagishi et al. |
| 5,002,281 A | 3/1991 | Nakahara et al. | | 5,480,155 A | 1/1996 | Molitor et al. |
| 5,009,427 A | 4/1991 | Stiefel et al. | | 5,482,286 A | 1/1996 | Molitor et al. |
| 5,009,428 A | 4/1991 | Yamagishi et al. | | 5,511,791 A | 4/1996 | Ebisuno et al. |
| 5,016,887 A | 5/1991 | Jonkouski | | 5,580,057 A | 12/1996 | Sullivan et al. |
| 5,018,740 A | 5/1991 | Sullivan | | 5,586,950 A | 12/1996 | Endo |
| 5,018,741 A | 5/1991 | Stiefel et al. | | 5,645,497 A | 7/1997 | Sullivan et al. |
| 5,020,803 A | 6/1991 | Gendreau et al. | | 5,688,192 A | 11/1997 | Aoyama |
| 5,024,444 A | 6/1991 | Yamagishi et al. | | 5,733,206 A | 3/1998 | Nesbitt et al. |
| 5,033,750 A | 7/1991 | Yamagishi et al. | | 5,733,207 A | 3/1998 | Sullivan et al. |
| 5,037,104 A | 8/1991 | Watanabe et al. | | 5,759,676 A | 6/1998 | Cavallaro et al. |
| 5,044,638 A | 9/1991 | Nesbitt et al. | | 5,803,831 A | 9/1998 | Sullivan et al. |
| 5,046,742 A | 9/1991 | Mackey | | 5,846,141 A | 12/1998 | Morgan et al. |
| 5,048,838 A | 9/1991 | Chikaraishi et al. | | 6,018,003 A | 1/2000 | Sullivan et al. |
| 5,060,953 A | 10/1991 | Bunger et al. | | 6,048,279 A * | 4/2000 | Masutani .................... 473/372 |
| 5,060,954 A | 10/1991 | Gobush | | 6,083,119 A | 7/2000 | Sullivan et al. |
| 5,062,644 A | 11/1991 | Lee | | 6,193,618 B1 * | 2/2001 | Sullivan et al. ............. 473/373 |
| 5,064,199 A | 11/1991 | Morell | | | | |
| 5,068,151 A | 11/1991 | Nakamura | | * cited by examiner | | |
| 5,072,945 A | 12/1991 | Oka et al. | | | | |

METHODS OF MAKING LOW SPIN GOLF BALL UTILIZING A MANTLE AND A CELLULAR OR LIQUID CORE

CROSS REFERENCES TO RELATED APPLICATIONS

This is a continuation application of U.S. Ser. No. 09/248,856 filed Feb. 11, 1999 now U.S. Pat. No. 6,193,618, which is a continuation-in-part of U.S. Ser. No. 08/716,016 filed Sep. 19, 1996, now U.S. Pat. No. 5,820,489; which is a divisional of U.S. Ser. No. 08/255,442 filed Jun. 8, 1994, now abandoned, which is a continuation of U.S. Ser. No. 08/054,406 filed Apr. 28, 1993 now U.S. Pat. No. 5,368,304. This is also a continuation-in-part of U.S. Ser. No. 08/969,083 filed Nov. 12, 1997 now U.S. Pat. No. 6,244,977 which claims priority from U.S. provisional application Serial No. 60/042,120 filed Mar. 28, 1997; U.S. provisional application Serial No. 60/042,430, filed Mar. 28, 1997; and is a continuation-in-part of Ser. No. 08/714,661 filed Sep. 16, 1996 now U.S. Pat. No. 6,368,237.

FIELD OF THE INVENTION

The present invention relates to golf balls and, more particularly, to improved two-piece golf balls having low spin rates. The improvement in the golf balls results from a combination of a relatively soft core and a hard cover made from blends of one or more specific hard, high stiffness ionomers. The combination of a soft core and a hard cover leads to an improved golf ball having a lower than anticipated spin rate while maintaining the resilience and durability characteristics necessary for repetitive play.

The present invention also relates to golf balls comprising one or more metal mantle layers and which further comprise a cellular or liquid core. The golf balls may comprise an optional inner polymeric hollow sphere substrate.

In an additional embodiment of the invention, the spin rate is further reduced by decreasing the weight of the relatively soft core while maintaining core size and by increasing the thickness of the cover. The larger, less dense finished ball exhibits lower spin rates after club impact than conventional balls.

BACKGROUND OF THE INVENTION

Spin rate is an important golf ball characteristic for both the skilled and unskilled golfer. High spin rates allow for the more skilled golfer, such as PGA professionals and low handicap players, to maximize control of the golf ball. This is particularly beneficial to the more skilled golfer when hitting an approach shot to a green. The ability to intentionally produce "back spin", thereby stopping the ball quickly on the green, and/or "side spin" to draw or fade the ball, substantially improves the golfer's control over the ball. Thus, the more skilled golfer generally prefers a golf ball exhibiting high spin rate properties.

However, a high spin golf ball is not desirous by all golfers, particularly high handicap players who cannot intentionally control the spin of the ball. In this regard, less skilled golfers, have, among others, two substantial obstacles to improving their game: slicing and hooking. When a club head meets a ball, an unintentional side spin is often imparted which sends the ball off its intended course. The side spin reduces one's control over the ball as well as the distance the ball will travel. As a result, unwanted strokes are added to the game.

Consequently, while the more skilled golfer desires a high spin golf ball, a more efficient ball for the less skilled player is a golf ball that exhibits low spin properties. The low spin ball reduces slicing and hooking and enhances roll distance for the amateur golfer.

The present inventors have addressed the need for developing a golf ball having a reduced spin rate after club impact, while at the same time maintaining durability, playability and resiliency characteristics needed for repeated use. The reduced spin rate golf ball of the present invention meets the rules and regulations established by the United States Golf Association (U.S.G.A.).

Along these lines, the U.S.G.A. has set forth five (5) specific regulations that a golf ball must conform to. The U.S.G.A. rules require that a ball be no smaller than 1.680 inches in diameter. However, notwithstanding this restriction, there is no specific limitation as to the maximum permissible diameter of a golf ball. As a result, a golf ball can be as large as desired so long as it is larger than 1.680 inches in diameter and so long as the other four (4) specific regulations are met.

The U.S.G.A. rules also require that balls weigh no more than 1.620 ounces, and that their initial velocity may not exceed 250 feet per second with a maximum tolerance of 2%, or up to 255 ft./sec. Further, the U.S.G.A. rules state that a ball may not travel a distance greater than 280 yards with a test tolerance of 6% when hit by the U.S.G.A. outdoor driving machine under specific conditions.

It has been determined by the present inventors that the combination of a relatively soft core (i.e. Riehle compression of about 75 to 160) and a hard cover (i.e. Shore D hardness of 65 or more) significantly reduces the overall spin rate of the resulting two piece golf ball. The inventors have also learned that an increase in cover thickness, thereby increasing the overall diameter of the resulting molded golf ball, further reduces spin rate.

Top-grade golf balls sold in the United States may be generally classified as one of two types: two-piece or three-piece balls. The two-piece ball, exemplified by the balls sold by Spalding & Evenflo Companies, Inc. (the assignee of the present invention through its wholly owned subsidiary, Lisco, Inc.) under the trademark TOP-FLITE, consists of a solid polymeric core and a separately formed outer cover. The so-called three-piece balls, exemplified by the balls sold under the trademark TITLEIST by the Acushnet Company, consist of a liquid (e.g., TITLEIST TOUR 384) or solid (e.g., TITLEIST DT) center, elastomeric thread windings about the center, and a cover.

Spalding's two-piece golf balls are produced by molding a natural (balata) or synthetic (i.e. thermoplastic resin such as an ionomer resin) polymeric cover composition around a preformed polybutadiene (rubber) core. During the molding process, the desired dimple pattern is molded into the cover material. In order to reduce the number of coating steps involved in the finishing of the golf balls, a color pigment or dye and, in many instances, an optical brightener, are added directly to the generally "off white" colored polymeric cover composition prior to molding. By incorporating the pigment and/or optical brightener in the cover composition molded onto the golf ball core, this process eliminates the need for a supplemental pigmented painting step in order to produce a white or colored (notably orange, pink and yellow) golf ball.

With respect to multi-layered golf balls, Spalding is the leading manufacturer of two-piece golf balls in the world. Spalding manufactures over sixty (60) different types of two-piece balls which vary distinctly in such properties as playability (i.e. spin rate, compression, feel, etc.), travel distance (initial velocity, C.O.R., etc.), durability (impact, cut and weather resistance) and appearance (i.e. whiteness, reflectance, yellowness, etc.) depending upon the ball's core, cover and coating materials, as well as the ball's surface configuration (i.e. dimple pattern). Consequently, Spalding's two-piece golf balls offer both the amateur and professional golfer a variety of performance characteristics to suit an individual's game.

In regard to the specific components of a golf ball, although the nature of the cover can, in certain instances, make a significant contribution to the overall feel, spin (control), coefficient of restitution (C.O.R.) and initial velocity of a ball (see, for example, U.S. Pat. No. 3,819,768 to Molitor), the initial velocity of two-piece and three-piece balls is determined mainly by the coefficient of restitution of the core. The coefficient of restitution of the core of wound (i.e. three-piece) balls can be controlled within limits by regulating the winding tension and the thread and center composition. With respect to two-piece balls, the coefficient of restitution of the core is a function of the properties of the elastomer composition from which it is made.

The cover component of a golf ball is particularly influential in effecting the compression (feel), spin rates (control), distance (C.O.R.), and durability (i.e. impact resistance, etc.) of the resulting ball. Various cover compositions have been developed by Spalding and others in order to optimize the desired properties of the resulting golf balls.

Over the last twenty (20) years, improvements in cover and core material formulations and changes in dimple patterns have more or less continually improved golf ball distance. Top-grade golf balls, however, must meet several other important design criteria. To successfully compete in today's golf ball market, a golf ball should be resistant to cutting and must be finished well; it should hold a line in putting and should have good click and feel. In addition, the ball should exhibit spin and control properties dictated by the skill and experience of the end user.

Prior artisans have attempted to incorporate metal layers or metal filler particles in golf balls to alter the physical characteristics and performance of the balls. For example, U.S. Pat. No. 3,031,194 to Strayer is directed to the use of a spherical inner metal layer that is bonded or otherwise adhered to a resilient inner constituent within the ball. The ball utilizes a liquid filled core. U.S. Pat. No. 4,863,167 to Matsuki, et al. describes golf balls containing a gravity filler which may be formed from one or more metals disposed within a solid rubber-based core. U.S. Pat. Nos. 4,886,275 and 4,995,613, both to Walker, disclose golf balls having a dense metal-containing core. U.S. Pat. No. 4,943,055 to Corley is directed to a weighted warmup ball having a metal center.

Prior artisans have also described golf balls having one or more interior layers formed from a metal, and which feature a hollow center. Davis disclosed a golf ball comprising a spherical steel shell having a hollow air-filled center in U.S. Pat. No. 697,816. Kempshall received numerous patents directed to golf balls having metal inner layers and hollow interiors, such as U.S. Pat. Nos. 704,748; 704,838; 713,772; and 739,753. In U.S. Pat. Nos. 1,182,604 and 1,182,605, Wadsworth described golf balls utilizing concentric spherical shells formed from tempered steel. U.S. Pat. No. 1,568,514 to Lewis describes several embodiments for a golf ball, one of which utilizes multiple steel shells disposed within the ball, and which provide a hollow center for the ball.

Prior artisans have attempted to provide golf balls having liquid filled centers. Toland described a golf ball having a liquid core in U.S. Pat. No. 4,805,914. Toland describes improved performance by removing dissolved gases present in the liquid to decrease the degree of compressibility of the liquid core. U.S. Pat. No. 5,037,104 to Watanabe, et al. and U.S. Pat. No. 5,194,191 to Nomura, et al. disclose thread wound golf balls having liquid cores. Similarly, U.S. Pat. No. 5,421,580 to Sugimoto, et al. and U.S. Pat. No. 5,511,791 to Ebisuno, et al. are both directed to thread wound golf balls having liquid cores limited to a particular range of viscosities or diameters. Moreover, Molitor, et al. described golf balls with liquid centers in U.S. Pat. Nos. 5,150,906 and 5,480,155.

Two U.S. patents disclosing a golf ball having a metal mantle layer in combination with a liquid core are U.S. Pat. No. 3,031,194 to Strayer and the previously noted U.S. Pat. No. 1,568,514 to Lewis. Unfortunately, the ball constructions and design teachings disclosed in these patents involve a large number of layers of different materials, relatively complicated or intricate manufacturing requirements, and/or utilize materials that have long been considered unacceptable for the present golf ball market.

Concerning attempts to provide golf balls with cellular or foamed polymeric materials utilized as a core, few approaches have been proposed. U.S. Pat. No. 4,839,116 to Puckett, et al. discloses a short distance golf ball. It is believed that artisans considered the use of foam or a cellular material undesirable in a golf ball, perhaps from a believed loss or decrease in the coefficient of restitution of a ball utilizing a cellular core.

Although satisfactory in at least some respects, all of the foregoing ball constructions, particularly the few utilizing a metal shell and a liquid core, are deficient. This is most evident when considered in view of the stringent demands of the current golf industry. Moreover, the few disclosures of a golf ball comprising a cellular or foam material do not motivate one to employ a cellular material in a regulation golf ball. Specifically, there is a need for a golf ball that exhibits a high initial velocity or coefficient of restitution (COR), may be driven relatively long distances in regulation play, and which may be readily and inexpensively manufactured.

In an alternative embodiment, the spin rate of the ball is further reduced by increasing the thickness of the cover and/or decreasing the weight and softness of the core. By increasing the cover thickness and/or the overall diameter of the resulting molded golf ball, enhanced reduction in spin rate is observed.

With respect to the increased size of the ball, over the years golf ball manufacturers have generally produced golf balls at or around the minimum size and maximum weight specifications set forth by the U.S.G.A. There have, however, been exceptions, particularly in connection with the manufacture of golf balls for teaching aids. For example, oversized, overweight (and thus unauthorized) golf balls have been on sale for use as golf teaching aids (see U.S. Pat. No. 3,201,384 to Barber).

Oversized golf balls are also disclosed in New Zealand Patent 192,618 dated Jan. 1, 1980, issued to a predecessor of the present assignee. This patent teaches an oversize golf ball having a diameter between 1.700 and 1.730 inches and an oversized core of resilient material (i.e. about 1.585 to 1.595 inches in diameter) so as to increase the coefficient of restitution. Additionally, the patent discloses that the ball should include a cover having a thickness less than the cover thickness of conventional balls (i.e. a cover thickness of about 0.050 inches as opposed to 0.090 inches for conventional two-piece balls).

In addition, it is also noted that golf balls made by Spalding in 1915 were of a diameter ranging from 1.630 inches to 1.710 inches. As the diameter of the ball increased, the weight of the ball also increased. These balls were comprised of covers made up of balata/gutta percha and cores made from solid rubber or liquid sacs and wound with elastic thread.

Golf balls known as the LYNX JUMBO were also commercially available by Lynx in October, 1979. These balls had a diameter of 1.76 to 1.80 inches. These balls met with little or no commercial success. The LYNX JUMBO balls consisted of a core comprised of wound core and a cover comprised of natural or synthetic balata.

However, notwithstanding the enhanced diameters of these golf balls, none of these balls produced the enhanced spin reduction characteristics and overall playability, distance and durability properties of the present invention and/or fall within the regulations set forth by the U.S.G.A. An object of the present invention is to produce a U.S.G.A. regulation golf ball having improved low spin properties while maintaining the resilience and durability characteristics necessary for repetitive play.

These and other objects and features of the invention will be apparent from the following summary and description of the invention and from the claims.

SUMMARY OF THE INVENTION

The present invention is directed to improved golf balls having a low rate of spin upon club impact. The golf balls comprise a soft core and a hard cover. The hard cover is preferably sized to be larger than conventional diameters. The low spin rate enables the ball to travel a greater distance. In addition, the low spin rate provides the less skilled golfer with more control. This is because the low spin rate decreases undesirable side spin which leads to slicing and hooking. The combination of a hard cover and a soft core provides for a ball having a lower than anticipated spin rate while maintaining high resilience and good durability.

The present invention provides, in a first aspect, a golf ball comprising a core including (i) a spherical metal mantle that defines a hollow interior, and (ii) a cellular core disposed within the metal mantle. The core exhibits a Riehle compression of at least about 75. The golf ball further includes a polymeric cover disposed about the core, the cover having a Shore D hardness of at least about 65.

In another aspect of the present invention, a golf ball is provided that comprises a core including (i) either a hollow polymeric spherical substrate or a hollow metal mantle, and (ii) a liquid disposed within the interior region of either the polymeric substrate or the metal mantle. The core of the golf ball exhibits a Riehle compression of at least about 75. The golf ball further includes a polymeric cover disposed about the core, the cover having a Shore D hardness of at least about 65.

Through the use of the softer cores and the hard cover, overall finished balls of the invention exhibit significantly lower spin rates than conventional balls of equal size and weight. Further, reduction in spin is also produced by increasing the thickness of the cover and by decreasing the weight of the softened core.

Further scope of the applicability of the present invention will become apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE PREFERRED EMBODIMENTS

The present invention relates to a golf ball having a low spin rate as a result of combining a relatively soft core and a hard cover. Such a lower spin rate after club impact contributes to straighter shots when the ball is mis-hit, greater efficiency in flight, and a lesser degree of energy loss on impact with the ground, adding increased roll or distance.

The present invention further relates to golf balls comprising one or more metal mantle layers and either a liquid or a cellular core component. The present invention also relates to methods for making such golf balls.

In addition, by increasing the diameter of the overall ball of the present invention beyond the U.S.G.A. minimum of 1.680 inches, the spin rate is still further decreased. In this embodiment of the invention, the ball, even though of larger diameter, uses substantially the same size core as a standard golf ball, the difference in size being provided by the additional thickness in the cover of the ball. This larger, low spin ball produces even greater control and flight efficiency than the standard size ball embodiment of the present invention.

Various measurements are referred to herein. These are as follows:

Riehle compression is a measurement of the deformation of a golf ball in thousandths of inches under a fixed static load of 200 pounds (a Riehle compression of 47 corresponds to a deflection under load of 0.047 inches).

Coefficient of restitution (C.O.R.) is measured by firing the resulting golf ball in an air cannon at a velocity of 125 feet per second against a steel plate which is positioned 12 feet from the muzzle of the cannon. The rebound velocity is then measured. The rebound velocity is divided by the forward velocity to give the coefficient of restitution.

Shore D hardness is measured in accordance with ASTM Test D-2240.

Figure 1:
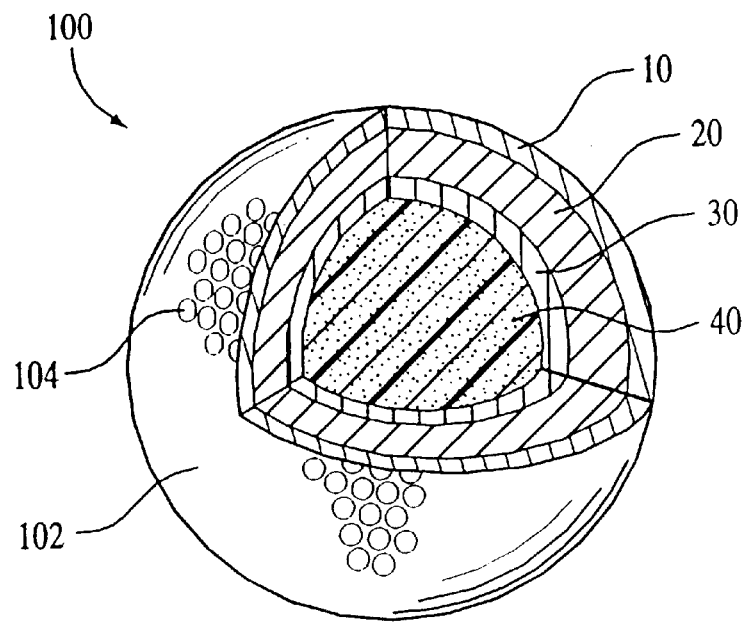
FIG. 1 is a partial cross-sectional view of a first preferred embodiment golf ball in accordance with the present invention, comprising a polymeric outer cover, one or more metal mantle layers, an optional polymeric hollow sphere substrate, and a cellular core.

FIG. 1 illustrates a first preferred embodiment golf ball 100 in accordance with the present invention. It will be understood that the referenced drawings are not necessarily to scale. The first preferred embodiment golf ball 100 comprises an outermost polymeric outer cover 10, one or more metal mantle layers 20, an innermost polymeric hollow sphere substrate 30, and a cellular core 40. The golf ball 100 provides a plurality of dimples 104 defined along an outer surface 102 of the golf ball 100.

Figure 2:
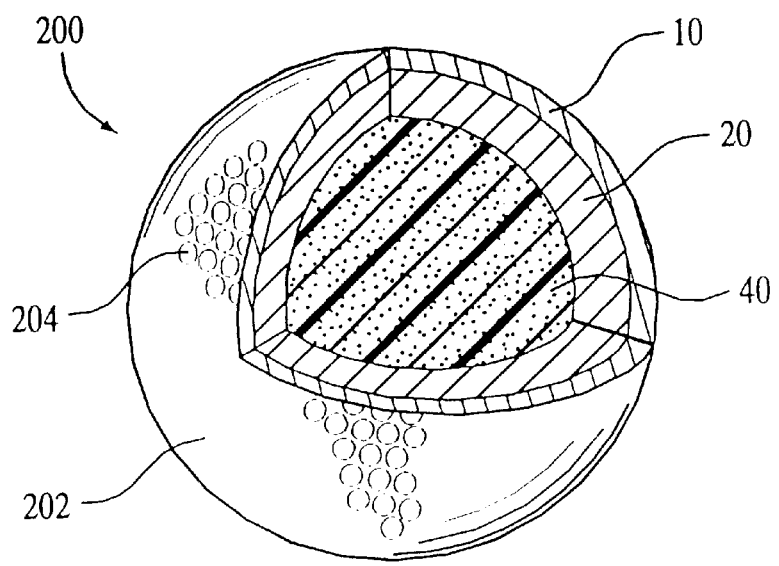
FIG. 2 is a partial cross-sectional view of a second preferred embodiment golf ball in accordance with the present invention, the golf ball comprising a polymeric outer cover, one or more metal mantle layers, and a cellular core.

FIG. 2 illustrates a second preferred embodiment golf ball 200 in accordance with the present invention. The golf ball 200 comprises an outermost polymeric outer cover 10, one or more metal mantle layers 20, and a cellular core 40. The second preferred embodiment golf ball 200 provides a plurality of dimples 204 defined along the outer surface 202 of the ball 200.

Figure 3:
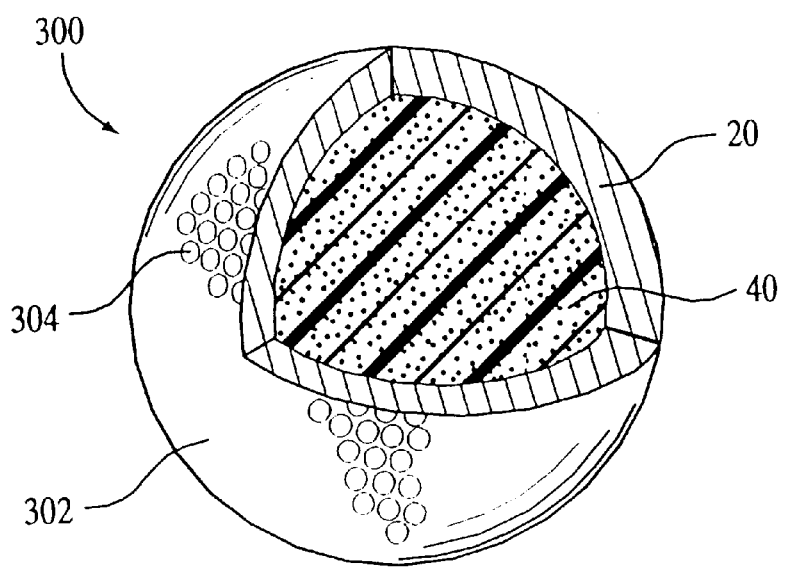
FIG. 3 is a partial cross-sectional view of a third preferred embodiment golf ball in accordance with the present invention, the golf ball comprising one or more metal mantle layers and a cellular core.

FIG. 3 illustrates a third preferred embodiment golf ball 300 in accordance with the present invention. The golf ball 300 comprises one or more metal mantle layers 20, and a cellular core 40. The golf ball 300 provides a plurality of dimples 304 defined along the outer surface 302 of the golf ball 300.

Figure 4:
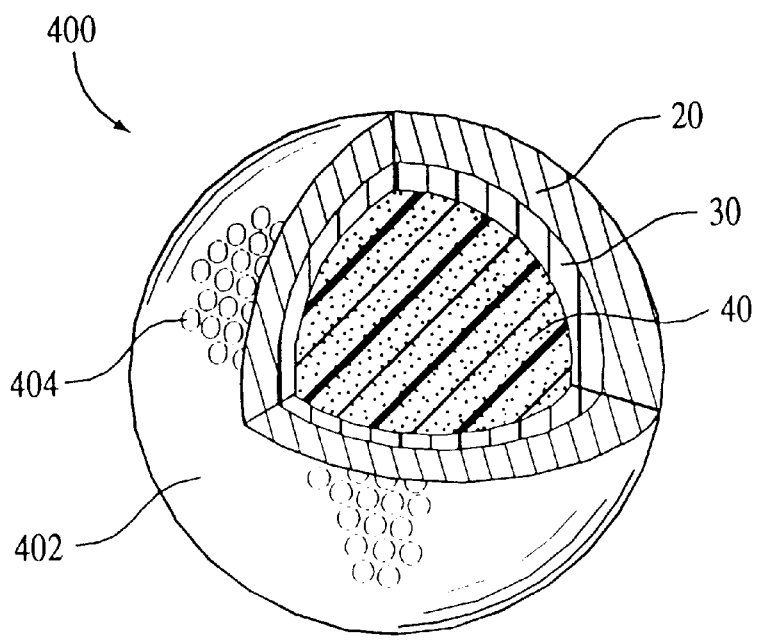
FIG. 4 is partial cross-sectional view of a fourth preferred embodiment golf ball in accordance with the present invention, the golf ball comprising one or more metal mantle layers, an optional polymeric hollow sphere substrate, and a cellular core.

FIG. 4 illustrates a fourth preferred embodiment golf ball 400 in accordance with the present invention. The golf ball 400 comprises one or more metal mantle layers 20, an optional polymeric hollow sphere substrate 30, and a cellular core 40. The golf ball 400 provides a plurality of dimples 404 defined along the outer surface 402 of the golf ball 400.

Figure 5:
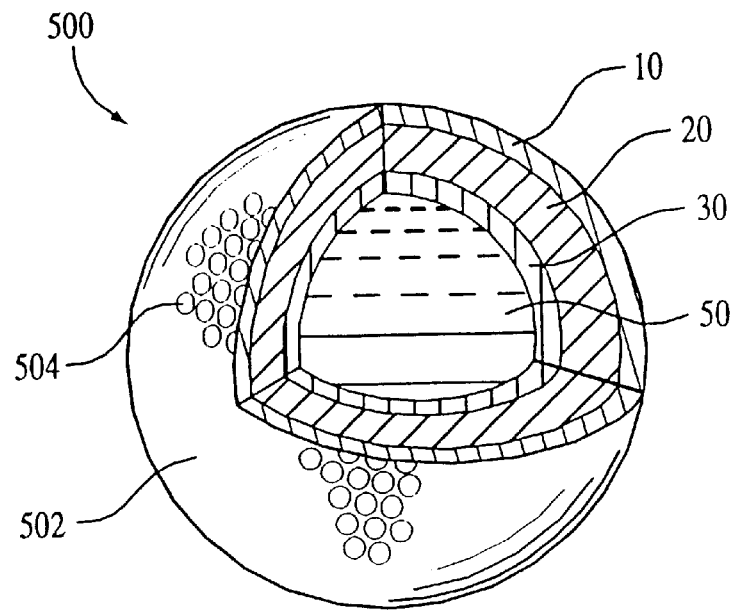
FIG. 5 is a partial cross-sectional view of a fifth preferred embodiment golf ball in accordance with the present invention, comprising a polymeric outer cover, one or more metal mantle layers, an optional polymeric hollow sphere substrate, and a liquid core.

FIG. 5 illustrates a fifth preferred embodiment golf ball 500 in accordance with the present invention. The fifth preferred embodiment golf ball 500 comprises an outermost polymeric outer cover 10, one or more metal mantle layers 20, an innermost polymeric hollow sphere substrate 30, and a liquid core 50. The golf ball 500 provides a plurality of dimples 504 defined along an outer surface 502 of the golf ball 500.

Figure 6:
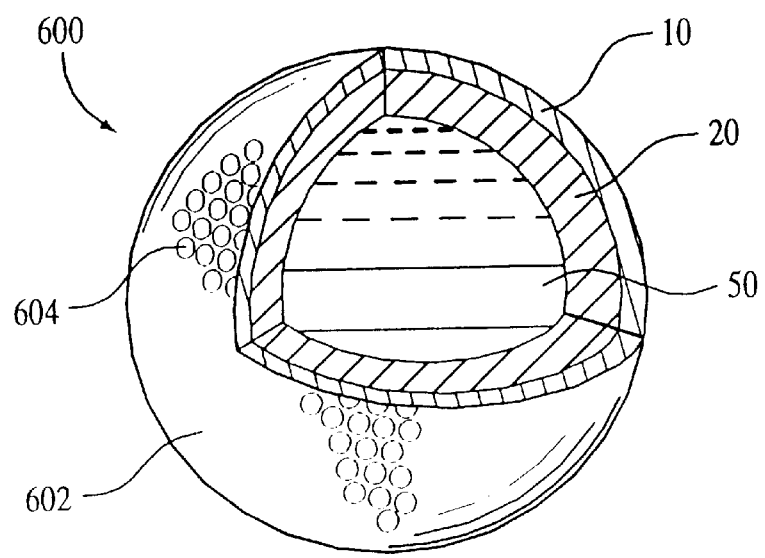
FIG. 6 is a partial cross-sectional view of a sixth preferred embodiment golf ball in accordance with the present invention, the golf ball comprising a polymeric outer cover, one or more metal mantle layers, and a liquid core.

FIG. 6 illustrates a sixth preferred embodiment golf ball 600 in accordance with the present invention. The golf ball 600 comprises an outermost polymeric outer cover 10, one or more metal mantle layers 20, and a liquid core 50. The sixth preferred embodiment golf ball 600 provides a plurality of dimples 604 defined along the outer surface 602 of the ball 600.

Figure 7:
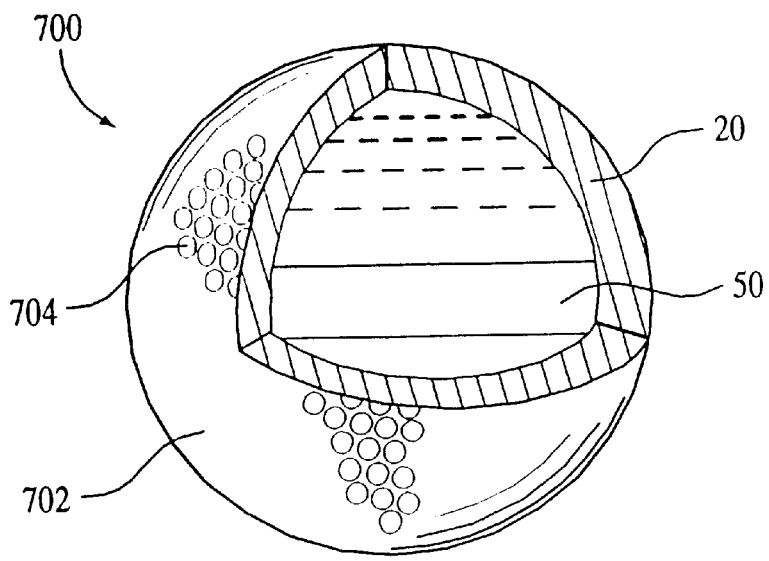
FIG. 7 is a partial cross-sectional view of a seventh preferred embodiment golf ball in accordance with the present invention, the golf ball comprising one or more metal mantle layers and a liquid core.

FIG. 7 illustrates a seventh preferred embodiment golf ball 700 in accordance with the present invention. The golf ball 700 comprises one or more metal mantle layers 20 and a liquid core 50. The golf ball 700 provides a plurality of dimples 704 defined along the outer surface 702 of the golf ball 700.

Figure 8:
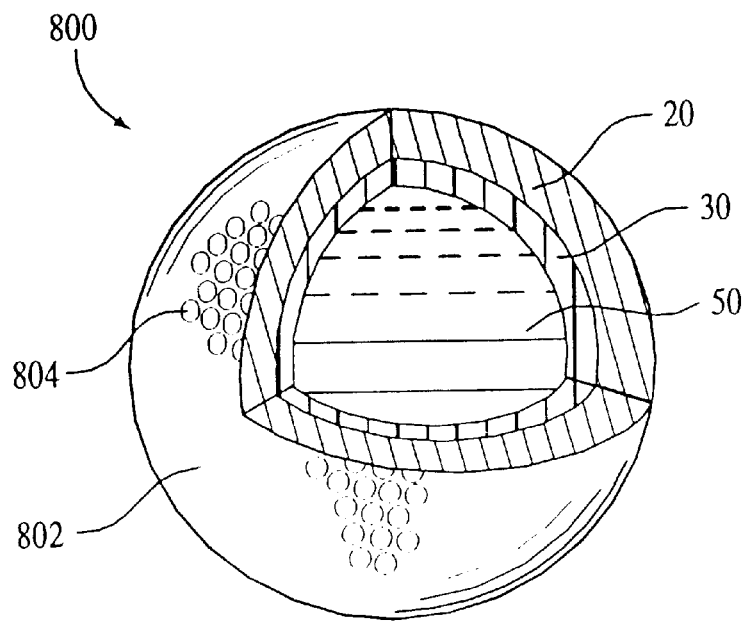
FIG. 8 is partial cross-sectional view of an eighth preferred embodiment golf ball in accordance with the present invention, the golf ball comprising one or more metal mantle layers, an optional polymeric hollow sphere substrate, and a liquid core.

FIG. 8 illustrates an eighth preferred embodiment golf ball 800 in accordance with the present invention. The golf ball 800 comprises one or more metal mantle layers 20, an optional polymeric hollow sphere substrate 30 and a liquid core 50. The golf ball 800 provides a plurality of dimples 804 defined along the outer surface 802 of the golf ball 800.

In all the foregoing noted preferred embodiments, i.e. golf balls 100, 200, 300, 400, 500, 600, 700, and 800, the golf balls utilize a cellular or liquid core or core component. In addition, all preferred embodiment golf balls comprise one or more metal mantle layers. As noted, in many of the embodiments of the invention, the Riehle compression of the core is at least about 75. Preferably, the Riehle compression is from 75 to about 160. And, the PGA compression is relatively low, such as from about 0 to about 85, and preferably about 10 to about 70. Details of the materials, configuration, and construction of each component in the preferred embodiment golf balls are set forth below.

Multilayer Metal Mantle

The preferred embodiment golf balls of the present invention comprise one or more metal mantle layers disposed inwardly and proximate to, and preferably adjacent to, the outer cover layer. A wide array of metals can be used in the mantle layers or shells as described herein. Table 1, set forth below, lists suitable metals for use in the preferred embodiment golf balls.

TABLE 1

Metals for Use in Mantle Layer(s)

| Metal | Young's modulus, E. $10^6$ psi | Bulk modulus, K. $10^6$ psi | Shear modulus, G. $10^6$ psi | Poisson's ratio, V |
|---|---|---|---|---|
| Aluminum | 10.2 | 10.9 | 3.80 | 0.345 |
| Brass, 30 Zn | 14.6 | 16.2 | 5.41 | 0.350 |
| Chromium | 40.5 | 23.2 | 16.7 | 0.210 |
| Copper | 18.8 | 20.0 | 7.01 | 0.343 |
| Iron (soft) | 30.7 | 24.6 | 11.8 | 0.293 |
| (cast) | 22.1 | 15.9 | 8.7 | 0.27 |
| Lead | 2.34 | 6.64 | 0.811 | 0.44 |
| Magnesium | 6.46 | 5.16 | 2.51 | 0.291 |
| Molybdenum | 47.1 | 37.9 | 18.2 | 0.293 |
| Nickel (soft) | 28.9 | 25.7 | 11.0 | 0.312 |
| (hard) | 31.8 | 27.2 | 12.2 | 0.306 |
| Nickel-silver, 55Cu-18Ni-27Zn | 19.2 | 19.1 | 4.97 | 0.333 |
| Niobium | 15.2 | 24.7 | 5.44 | 0.397 |
| Silver | 12.0 | 15.0 | 4.39 | 0.367 |
| Steel, mild | 30.7 | 24.5 | 11.9 | 0.291 |
| Steel, 0.75 C. | 30.5 | 24.5 | 11.8 | 0.293 |
| Steel, 0.75 C., hardened | 29.2 | 23.9 | 11.3 | 0.296 |
| Steel, tool | 30.7 | 24.0 | 11.9 | 0.287 |
| Steel, tool, hardened | 29.5 | 24.0 | 11.4 | 0.295 |
| Steel, stainless, 2Ni-18Cr | 31.2 | 24.1 | 12.2 | 0.283 |
| Tantalum | 26.9 | 28.5 | 10.0 | 0.342 |
| Tin | 7.24 | 8.44 | 2.67 | 0.357 |
| Titanium | 17.4 | 15.7 | 6.61 | 0.361 |
| Titanium/Nickel alloy | | | | |
| Tungsten | 59.6 | 45.1 | 23.3 | 0.280 |
| Vanadium | 18.5 | 22.9 | 6.77 | 0.365 |
| Zinc | 15.2 | 10.1 | 6.08 | 0.249 |

Preferably, the metals used in the one or more mantle layers are steel, titanium, chromium, nickel, or alloys thereof. Generally, it is preferred that the metal selected for use in the mantle be relatively stiff, hard, dense, and have a relatively high modulus of elasticity.

The thickness of the metal mantle layer depends upon the density of the metals used in that layer, or if a plurality of metal mantle layers are used, the densities of those metals in other layers within the mantle. Typically, the thickness of the mantle ranges from about 0.001 inches to about 0.050 inches. The preferred thickness for the mantle is from about 0.005 inches to about 0.050 inches. The most preferred range is from about 0.005 inches to about 0.010 inches. It is preferred that the thickness of the mantle be uniform and constant at all points across the mantle.

As noted, the thickness of the metal mantle depends upon the density of the metal(s) utilized in the one or more mantle layers. Table 2, set forth below, lists typical densities for the preferred metals for use in the mantle.

TABLE 2

| Metal | Density (grams per cubic centimeter) |
|---|---|
| Chromium | 6.46 |
| Nickel | 7.90 |
| Steel (approximate) | 7.70 |
| Titanium | 4.13 |

There are at least two approaches in forming a metal mantle utilized in the preferred embodiment golf balls. In a first embodiment, two metal half shells are stamped from metal sheet stock. The two half shells are then arc welded or otherwise together and heat treated to stress relieve. It is preferred to heat treat the resulting assembly since welding will typically anneal and soften the resulting hollow sphere resulting in "oil canning," i.e. deformation of the metal sphere after impact, such as may occur during play.

In a second embodiment, a metal mantle is formed via electroplating over a thin hollow polymeric sphere, described in greater detail below. This polymeric sphere may correspond to the previously described optional polymeric hollow sphere substrate 30. There are several preferred techniques by which a metallic mantle layer may be deposited upon a non-metallic substrate. In a first category of techniques, an electrically conductive layer is formed or deposited upon the polymeric or non-metallic sphere. Electroplating may be used to fully deposit a metal layer after a conductive salt solution is applied onto the surface of the non-metallic substrate. Alternatively, or in addition, a thin electrically conducting metallic surface can be formed by flash vacuum metallization of a metal agent, such as aluminum, onto the substrate of interest. Such surfaces are typically about $3 \times 10^{-6}$ of an inch thick. Once deposited, electroplating can be utilized to form the metal layer(s) of interest. It is contemplated that vacuum metallization could be employed to fully deposit the desired metal layer(s). Yet another technique for forming an electrically conductive metal base layer is chemical deposition. Copper, nickel, or silver, for example, may be readily deposited upon a non-metallic surface. Yet another technique for imparting electrical conductivity to the surface of a non-metallic substrate is to incorporate an effective amount of electrically conductive particles in the substrate, such as carbon black, prior to molding. Once having formed an electrically conductive surface, electroplating processes can be used to form the desired metal mantle layers.

Alternatively, or in addition, various thermal spray coating techniques can be utilized to form one or more metal mantle layers onto a spherical substrate. Thermal spray is a generic term generally used to refer to processes for depositing metallic and non-metallic coatings, sometimes known as metallizing, that comprise the plasma arc spray, electric arc spray, and flame spray processes. Coatings can be sprayed from rod or wire stock, or from powdered material.

A typical plasma arc spray system utilizes a plasma arc spray gun at which one or more gasses are energized to a highly energized state, i.e. a plasma, and are then discharged typically under high pressures toward the substrate of interest. The power level, pressure, and flow of the arc gasses, and the rate of flow of powder and carrier gas are typically control variables.

The electric arc spray process preferably utilizes metal in wire form. This process differs from the other thermal spray processes in that there is no external heat source, such as from a gas flame or electrically induced plasma. Heating and melting occur when two electrically opposed charged wires, comprising the spray material, are fed together in such a manner that a controlled arc occurs at the intersection. The molten metal is atomized and propelled onto a prepared substrate by a stream of compressed air or gas.

The flame spray process utilizes combustible gas as a heat source to melt the coating material. Flame spray guns are available to spray materials in rod, wire, or powder form. Most flame spray guns can be adapted for use with several combinations of gases. Acetylene, propane, mapp gas, and oxygen-hydrogen are commonly used flame spray gases.

Another process or technique for depositing a metal mantle layer onto a spherical substrate in the preferred embodiment golf balls is chemical vapor deposition (CVD). In the CVD process, a reactant atmosphere is fed into a processing chamber where it decomposes at the surface of the substrate of interest, liberating one material for either absorption by or accumulation on the work piece or substrate. A second material is liberated in gas form and is removed from the processing chamber, along with excess atmosphere gas, as a mixture referred to as off-gas.

The reactant atmosphere that is typically used in CVD includes chlorides, fluorides, bromides and iodides, as well as carbonyls, organometallics, hydrides and hydrocarbons. Hydrogen is often included as a reducing agent. The reactant atmosphere must be reasonably stable until it reaches the substrate, where reaction occurs with reasonably efficient conversion of the reactant. Sometimes it is necessary to heat the reactant to produce the gaseous atmosphere. A few reactions for deposition occur at substrate temperatures below 200 degrees C. Some organometallic compounds deposit at temperatures of 600 degrees C. Most reactions and reaction products require temperatures above 800 degrees C.

Common CVD coatings include nickel, tungsten, chromium, and titanium carbide. CVD nickel is generally separated from a nickel carbonyl, $Ni(CO)_4$, atmosphere. The properties of the deposited nickel are equivalent to those of sulfonate nickel deposited electrolytically. Tungsten is deposited by thermal decomposition of tungsten carbonyl at 300 to 600 degrees C, or may be deposited by hydrogen reduction of tungsten hexachloride at 700 to 900 degrees C. The most convenient and most widely used reaction is the hydrogen reduction of tungsten hexafluoride. If depositing chromium upon an existing metal layer, this may be done by pack cementation, a process similar to pack carbonizing, or by a dynamic, flow-through CVD process. Titanium carbide coatings may be formed by the hydrogen reduction of titanium tetrafluoride in the presence of methane or some other hydrocarbon. The substrate temperatures typically range from 900 to 1010 degrees C., depending on the substrate.

Surface preparation for CVD coatings generally involve de-greasing or grit blasting. In addition, a CVD pre-coating treatment may be given. The rate of deposition from CVD reactions generally increases with temperature in a manner specific to each reaction. Deposition at the highest possible rate is preferable, however, there are limitations which require a processing compromise.

Vacuum coating is another category of processes for depositing metals and metal compounds from a source in a high vacuum environment onto a substrate, such as the spherical substrate used in several of the preferred embodiment golf balls. Three principal techniques are used to accomplish such deposition: evaporation, ion plating, and sputtering. In each technique, the transport of vapor is carried out in an evacuated, controlled environment chamber and, typically, at a residual air pressure of 1 to $10^{-5}$ Pascals.

In the evaporation process, vapor is generated by heating a source material to a temperature such that the vapor pressure significantly exceeds the ambient chamber pressure and produces sufficient vapor for practical deposition. To coat the entire surface of a substrate, such as the inner spherical substrate utilized in several of the preferred embodiment golf balls, it must be rotated and translated over the vapor source. Deposits made on substrates positioned at low angles to the vapor source generally result in fibrous, poorly bonded structures. Deposits resulting from excessive gas scattering are poorly adherent, amorphous, and generally dark in color. The highest quality deposits are made on surfaces nearly normal or perpendicular to the vapor flux. Such deposits faithfully reproduce the substrate surface texture. Highly polished substrates produce lustrous deposits, and the bulk properties of the deposits are maximized for the given deposition conditions.

For most deposition rates, source material should be heated to a temperature so that its vapor pressure is at least 1 Pascal or higher. Deposition rates for evaporating bulk vacuum coatings can be very high. Commercial coating equipment can deposit up to 500,000 angstroms of material thickness per minute using large ingot material sources and high powered electron beam heating techniques.

As indicated, the directionality of evaporating atoms from a vapor source generally requires the substrate to be articulated within the vapor cloud. To obtain a specific film distribution on a substrate, the shape of the object, the arrangement of the vapor source relative to the component surfaces, and the nature of the evaporation source may be controlled.

Concerning evaporation sources, most elemental metals, semi-conductors, compounds, and many alloys can be directly evaporated in vacuum. The simplest sources are resistance wires and metal foils. They are generally constructed of refractory metals, such as tungsten, molybdenum, and tantalum. The filaments serve the dual function of heating and holding the material for evaporation. Some elements serve as sublimation sources such as chromium, palladium, molybdenum, vanadium, iron, and silicon, since they can be evaporated directly from the solid phase. Crucible sources comprise the greatest applications in high volume production for evaporating refractory metals and compounds. The crucible materials are usually refractory metals, oxides, and nitrides, and carbon. Heating can be accomplished by radiation from a second refractory heating element, by a combination of radiation and conduction, and by radial frequency induction heating.

Several techniques are known for achieving evaporation of the evaporation source. Electron beam heating provides a flexible heating method that can concentrate heat on the evaporant. Portions of the evaporant next to the container can be kept at low temperatures, thus minimizing interaction. Two principal electron guns in use are the linear focusing gun, which uses magnetic and electrostatic focusing methods, and the bent-beam magnetically focused gun. Another technique for achieving evaporation is continuous feed high rate evaporation methods. High rate evaporation of alloys to form film thicknesses of 100 to 150 micrometers requires electron beam heating sources in large quantities of evaporant. Electron beams of 45 kilowatts or higher are used to melt evaporants in water cooled copper hearths up to 150 by 400 millimeters in cross section.

Concerning the substrate material of the spherical shell upon which one or more metal layers are formed in several of the preferred embodiment golf balls, the primary requirement of the material to be coated is that it be stable in vacuum. It must not evolve gas or vapor when exposed to the metal vapor. Gas evolution may result from release of gas absorbed on the surface, release of gas trapped in the pores of a porous substrate, evolution of a material such as plasticizers used in plastics, or actual vaporization of an ingredient in the substrate material.

In addition to the foregoing methods, sputtering may be used to deposit one or more metal layers onto, for instance, an inner hollow sphere substrate such as substrate 30 utilized in some of the preferred embodiment golf balls. Sputtering is a process wherein material is ejected from the surface of a solid or liquid because of a momentum exchange associated with bombardment by energetic particles. The bombarding species are generally ions of a heavy inert gas. Argon is most commonly used. The source of ions may be an ion beam or a plasma discharge into which the material can be bombarded is immersed.

In the plasma-discharge sputter coating process, a source of coating material called a target is placed in a vacuum chamber which is evacuated and then back filled with a working gas, such as Argon, to a pressure adequate to sustain the plasma discharge. A negative bias is then applied to the target so that it is bombarded by positive ions from the plasma.

Sputter coating chambers are typically evacuated to pressures ranging from 0.001 to 0.00001 Pascals before back filling with Argon to pressures of 0.1 to 10 Pascals. The intensity of the plasma discharge, and thus the ion flux and sputtering rate that can be achieved, depends on the shape of the cathode electrode, and on the effective use of a magnetic field to confine the plasma electrons. The deposition rate in sputtering depends on the target sputtering rate and the apparatus geometry. It also depends on the working gas pressure, since high pressures limit the passage of sputtered flux to the substrates.

Ion plating may also be used to form one or more metal mantle layers in the golf balls of the present invention. Ion plating is a generic term applied to atomistic film deposition processes in which the substrate surface and/or the depositing film is subjected to a flux of high energy particles (usually gas ions) sufficient to cause changes in the interfacial region or film properties. Such changes may be in the film adhesion to the substrate, film morphology, film density, film stress, or surface coverage by the depositing film material.

Ion plating is typically done in an inert gas discharge system similar to that used in sputtering deposition except that the substrate is the sputtering cathode and the bombarded surface often has a complex geometry. Basically, the ion plating apparatus is comprised of a vacuum chamber and a pumping system, which is typical of any conventional vacuum deposition unit. There is also a film atom vapor source and an inert gas inlet. For a conductive sample, the work piece is the high voltage electrode, which is insulated from the surrounding system. In the more generalized situation, a work piece holder is the high voltage electrode and either conductive or non-conductive materials for plating are attached to it. Once the specimen to be plated is attached to the high voltage electrode or holder and the filament vaporization source is loaded with the coating material, the system is closed and the chamber is pumped down to a pressure in the range of 0.001 to 0.0001 Pascals. When a desirable vacuum has been achieved, the chamber is back filled with Argon to a pressure of approximately 1 to 0.1 Pascals. An electrical potential of −3 to −5 kilovolts is then introduced across the high voltage electrode, that is the specimen or specimen holder, and the ground for the system. Glow discharge occurs between the electrodes which results in the specimen being bombarded by the high energy Argon ions produced in the discharge, which is equivalent to direct current sputtering. The coating source is then energized and the coating material is vaporized into the glow discharge.

Another class of materials, contemplated for use in forming the one or more metal mantle layers is nickel titanium alloys. These alloys are known to have super elastic properties and are approximately 50 percent (atomic) nickel and 50 percent titanium. When stressed, a super elastic nickel titanium alloy can accommodate strain deformations of up to 8 percent. When the stress is later released, the super elastic component returns to its original shape. Other shape memory alloys can also be utilized including alloys of copper zinc aluminum, and copper aluminum nickel. Table 3 set forth below presents various physical, mechanical, and transformation properties of these three preferred shape memory alloys.

TABLE 3

Properties of Shape Memory Alloys

|  | Cu-Zn-Al | Cu-Al-Ni | Ni-Ti |
|---|---|---|---|
| PHYSICAL PROPERTIES | | | |
| Density (g/cm$^3$) | 7.64 | 7.12 | 6.5 |
| Resistivity ($\mu\Omega$-cm) | 8.5–9.7 | 11–13 | 80–100 |
| Thermal Conductivity (J/m-s-K) | 120 | 30–43 | 10 |
| Heat Capacity (J/Kg-K) | 400 | 373–574 | 390 |
| MECHANICAL PROPERTIES | | | |
| Young's Modulus (GPa) | | | |
| β-Phase | 72 | 85 | 83 |
| Martensite | 70 | 80 | 34 |
| Yield strength (MPa) | | | |
| β-Phase | 350 | 400 | 690 |
| Martensite | 80 | 130 | 70–150 |
| Ultimate Tensile Strength (Mpa) | 600 | 500–800 | 900 |
| TRANSFORMATION PROPERTIES | | | |
| Heat of Transformation (J/mole) | | | |
| Martensite | 160–440 | 310–470 | |
| R-Phase | | | 55 |
| Hysteresis (K) | | | |
| Martensite | 10–25 | 15–20 | 30–40 |
| R-Phase | | | 2–5 |
| Recoverable Strain (%) | | | |
| One-Way (Martensite) | 4 | 4 | 8 |
| One-Way (R-Phase | | | 0.5–1 |
| Two-Way (Martensite) | 2 | 2 | 3 |

In preparing the preferred embodiment golf balls, the polymeric outer cover layer, if utilized, is molded (for instance, by injection molding or by compression molding) about the metal mantle.

Core

The preferred embodiment golf ball may comprise one of two types of cores—a cellular core comprising a material having a porous or cellular configuration; or a liquid core. Suitable materials for a cellular core include, but are not limited to, foamed elastomeric materials such as, for example, crosslinked polybutadiene/ZDA mixtures, polyurethanes, polyolefins, ionomers, metallocenes, polycarbonates, nylons, polyesters, and polystyrenes. Preferred materials include polybutadiene/ZDA mixtures, ionomers, and metallocenes. The most preferred materials are foamed crosslinked polybutadiene/ZDA mixtures.

The shape and configuration of the foamed core is spherical. The diameter of the cellular core typically ranges from about 1.340 inches to about 1.638 inches, and most preferably from about 1.500 inches to about 1.540 inches. It is generally preferred that the core, whether a cellular core or a liquid core, be immediately adjacent to, and thus next to, the inner surface of either the metal mantle layer or the polymeric hollow sphere.

If the cellular core is used in conjunction with a metal mantle, the selection of the type of metal for the mantle will determine the size and density for the cellular core. A hard, high modulus metal will require a relatively thin mantle so that ball compression is not too hard. If the mantle is relatively thin, the ball may be too light in weight so a cellular core will be required to add weight and, further, to add resistance to oil canning or deformation of the metal mantle. In contrast, a solid core would likely also add too much weight to the finished ball and, therefore, a cellular core is preferred to provide proper weight and resilience.

The weight of the cellular core can be controlled by the cellular density. The cellular core typically has a specific gravity of from about 0.10 to about 1.0. The coefficient of restitution of the cellular core should be at least 0.500.

The structure of the cellular core may be either open or closed cell. It is preferable to utilize a closed cell configuration with a solid surface skin that can be metallized or receive a conductive coating. The preferred cell size is that required to obtain an apparent specific gravity of from about 0.10 to about 1.0.

In a preferred method, a cellular core is fabricated and a metallic cover applied over the core. The metallic cover may be deposited by providing a conductive coating or layer about the core and electroplating one or more metals on that coating to the required thickness. Alternatively, two metallic half shells can be welded together and a flowable cellular material, for example a foam, or a cellular core material precursor, injected through an aperture in the metallic sphere using a two component liquid system that forms a semi-rigid or rigid material or foam. The fill hole in the metal mantle may be sealed to prevent the outer cover stock from entering into the cellular core during cover molding.

If the cellular core is prefoamed or otherwise formed prior to applying the metallic layer, the blowing agent may be one or more conventional agents that release a gas, such as nitrogen or carbon dioxide. Suitable blowing agents include, but are not limited to, azodicarbonamide, N,N-dinitrosopentamethylene-tetramine, 4-4 oxybis(benzenesulfonylhydrazide), and sodium bicarbonate. The preferred blowing agents are those that produce a fine closed cell structure forming a skin on the outer surface of the core.

A cellular core may be encapsulated or otherwise enclosed by the metal mantle, for instance by affixing two hemispherical halves of a metal shell together about a cellular core. It is also contemplated to introduce a foamable cellular core material precursor within a hollow spherical metal mantle and subsequently foaming that material in situ.

In yet another variant embodiment, an optional polymeric hollow sphere, such as for example, the hollow sphere substrate 30, may be utilized to receive a cellular material. One or more metal mantle layers, such as metal mantle layers 20, can then be deposited or otherwise disposed about the polymeric sphere. If such a polymeric sphere is utilized in conjunction with a cellular core, it is preferred that the core material be introduced into the hollow sphere as a flowable material. Once disposed within the hollow sphere, the material may foam and expand in volume to the shape and configuration of the interior of the hollow sphere.

As noted, the preferred embodiment golf ball may include a liquid core. In one variant, the liquid filled core disclosed in U.S. Pat. Nos. 5,480,155 and 5,150,906, both herein incorporated by reference, is suitable. Suitable liquids for use in the present invention golf balls include, but are not limited to, water, alcohol, oil, combinations of these, solutions such as glycol and water, or salt and water. Other suitable liquids include oils or colloidal suspensions, such as clay, barytes, or carbon black in water or other liquid. A preferred liquid core material is a solution of inorganic salt in water. The inorganic salt is preferably calcium chloride. The preferred glycol is glycerine.

The most inexpensive liquid is a salt-water solution. All of the liquids noted in the previously-mentioned, '155 and '906 patents are suitable. The density of the liquid can be adjusted to achieve the desired final weight of the golf ball.

The most preferred technique for forming a ball having a liquid core is to form a thin, hollow polymeric sphere by blow molding or forming two half shells and then joining the two half shells together. The hollow sphere is then filled with a suitable liquid and sealed. These techniques are described in the '155 and '906 patents.

The liquid filled sphere is then preferably metallized, such as via electroplating, to a suitable thickness of from about 0.001 inches to about 0.050 inches. The resulting metal mantle may further receive one or more other metal mantle layers. The metallized sphere is then optionally covered with a polymeric dimpled cover by injection or compression molding and then finished using conventional methods.

A liquid core is preferable over a solid core in that it develops less spin initially and has greater spin decay resulting in a lower trajectory with increased total distance.

Optional Polymeric Sphere

A wide array of polymeric materials can be utilized to form the thin hollow sphere or shell as referred to herein and generally depicted in the accompanying drawings as the sphere 30. Thermoplastic materials are generally preferred for use as materials for the shell. Typically, such materials should exhibit good flowability, moderate stiffness, high abrasion resistance, high tear strength, high resilience, and good mold release, among others.

Synthetic polymeric materials which may be used for the thin hollow sphere include homopolymeric and copolymer materials which may include: (1) Vinyl resins formed by the polymerization of vinyl chloride, or by the copolymerization of vinyl chloride with vinyl acetate, acrylic esters or vinylidene chloride; (2) Polyolefins such as polyethylene, polypropylene, polybutylene, and copolymers such as polyethylene methylacrylate, polyethylene ethylacrylate, polyethylene vinyl acetate, polyethylene methacrylic or polyethylene acrylic acid or polypropylene acrylic acid or terpolymers made from these and acrylate esters and their metal ionomers, polypropylene/EPDM grafted with acrylic acid or anhydride modified polyolefins; (3) Polyurethanes, such as are prepared from polyols and diisocyanates or polyisocyanates; (4) Polyamides such as poly (hexamethylene adipamide) and others prepared from diamines and dibasic acids, as well as those from amino acid such as poly(caprolactam), and blends of polyamides with SURLYN, polyethylene, ethylene copolymers, EDPA, etc; (5) Acrylic resins and blends of these resins with polyvinyl chloride, elastomers, etc.; (6) Thermoplastic rubbers such as the urethanes, olefinic thermoplastic rubbers such as blends of polyolefins with EPDM, block copolymers of styrene and butadiene, or isoprene or ethylene-butylene rubber, polyether block amides; (7) Polyphenylene oxide resins, or blends of polyphenylene oxide with high impact polystyrene; (8) Thermoplastic polyesters, such as PET, PBT, PETG, and elastomers sold under the trademark HYTREL by E. I. DuPont De Nemours & Company of Wilmington, Del.; (9) Blends and alloys including polycarbonate with ABS, PBT, PET, SMA, PE elastomers, etc. and PVC with ABS or EVA or other elastomers; (10) Blends of thermoplastic rubbers with polyethylene, polypropylene, polyacetal, nylon, polyesters, cellulose esters, etc.; and (11) plastomers-metalloenes such as Exact from Exxon and Engage resins from Dow Chemical.

It is also within the purview of this invention to add to the compositions employed for the thin hollow shell agents which do not affect the basic characteristics of the shell. Among such materials are antioxidants, antistatic agents, and stabilizers. Notwithstanding the overall size differences of the various embodiments of the present invention, the core of the present invention is relatively soft and of similar size. It has a Riehle compression of about 75 or more, preferably about 75 to about 115, and a relatively low PGA compression of about 40 to 85, preferably about 70–80.

Cover

The cover is preferably comprised of a hard, high-stiffness ionomer resin, most preferably a metal cation neutralized high acid ionomer resin containing more than 16% carboxylic acid by weight, or blend thereof. The cover has a Shore D hardness of about 65 or greater.

With respect to the ionomeric cover composition of the invention, ionomeric resins are polymers containing interchain ionic bonding. As a result of their toughness, durability, and flight characteristics, various ionomeric resins sold by E. I. DuPont de Nemours & Company under the trademark "Surlyn®" and more recently, by the Exxon Corporation (see U.S. Pat. No. 4,911,451) under the trademark "Escor®" and the tradename "Iotek", have become the materials of choice for the construction of golf ball covers over the traditional "balata" (trans-polyisoprene, natural or synthetic) rubbers.

Ionomeric resins are generally ionic copolymers of an olefin, such as ethylene, and a metal salt of an unsaturated carboxylic acid, such as acrylic acid, methacrylic acid or maleic acid. In some instances, an additional softening comonomer such as an acrylate can also be included to form a terpolymer. The pendent ionic groups in the ionomeric resins interact to form ion-rich aggregates contained in a non-polar polymer matrix. The metal ions, such as sodium, zinc, magnesium, lithium, potassium, calcium, etc. are used to neutralize some portion of the acid groups in the copolymer resulting in a thermoplastic elastomer exhibiting enhanced properties, i.e., improved durability, etc. for golf ball construction over balata.

The ionomeric resins utilized to produce cover compositions can be formulated according to known procedures such as those set forth in U. S. Pat. No. 3,421,766 or British Patent No. 963,380, with neutralization effected according to procedures disclosed in Canadian Patent Nos. 674,595 and 713,631, wherein the ionomer is produced by copolymerizing the olefin and carboxylic acid to produce a copolymer having the acid units randomly distributed along the polymer chain. Broadly, the ionic copolymer generally comprises one or more α-olefins and from about 9 to about 20 weight percent of α,β-ethylenically unsaturated mono- or dicarboxylic acid, the basic copolymer neutralized with metal ions to the extent desired.

At least about 20% of the carboxylic acid groups of the copolymer are neutralized by the metal ions (such as sodium, potassium, zinc, calcium, magnesium, and the like) and exist in the ionic state. Suitable olefins for use in preparing the ionomeric resins include ethylene, propylene, butene-1, hexene-1 and the like. Unsaturated carboxylic acids include acrylic, methacrylic, ethacrylic, α-chloroacrylic, crotonic, maleic, fumaric, itaconic acids, and the like. The ionomeric resins utilized in the golf ball industry are generally copolymers of ethylene with acrylic (i.e., Escor®) and/or methacrylic (i.e., Surlyn®) acid. In addition, two or more types of ionomeric resins may be blended in to the cover compositions in order to produce the desired properties of the resulting golf balls.

The cover compositions which may be used in making the golf balls of the present invention are set forth in detail but not limited to those in copending U.S. Ser. No. 07/776,803 filed Oct. 15, 1991, and Ser. No. 07/901,660 filed Jun. 19, 1992, both incorporated herein by reference. In short, the cover material is comprised of hard, high stiffness ionomer resins, preferably containing relatively high amounts of acid (i.e., greater than 16 weight percent acid, preferably from about 17 to about 25 weight percent acid, and more preferably from about 18.5 to about 21.5 weight percent) and at least partially neutralized with metal ions (such as sodium, zinc, potassium, calcium, magnesium and the like). The high acid resins are blended and melt processed to produce compositions exhibiting enhanced hardness and coefficient of restitution values when compared to low acid ionomers, or blends of low acid ionomer resins containing 16 weight percent acid or less.

The preferred cover compositions are made from specific blends of two or more high acid ionomers with other cover additives which do not exhibit the processing, playability, distance and/or durability limitations demonstrated by the prior art. However, as more particularly indicated below, the cover composition can also be comprised of one or more low acid ionomers so long as the molded covers exhibit a hardness of 65 or more on the Shore D scale.

The cover has a Shore D hardness of 65 or greater. Its composition includes a hard, high stiffness preferably high acid ionomer such as that sold by E. I. DuPont de Nemours & Company under the trademark "Surlyn®" and by Exxon Corporation under the trademark "Escor®" or tradename "Iotek", or blends thereof. In addition to the Surlyn® and Escor® or Iotek ionomers, the cover may comprise any ionomer which either alone or in combination with other ionomers produces a molded cover having a Shore D hardness of at least 65. These include lithium ionomers or blends of ionomers with harder non-ionic polymers such as nylon, polyphenylene oxide and other compatible thermoplastics. As briefly mentioned above, examples of cover compositions which may be used are set forth in detail in copending U.S. Ser. No. 07/776,803 filed Oct. 15, 1991, and Ser. No. 07/901,660 filed Jun. 19, 1992, both incorporated herein by reference. Of course, the cover compositions are not limited in any way to those compositions set forth in said copending applications.

The high acid ionomers suitable for use in the present invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the high acid ionomer resins included in the cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Although the cover composition preferably includes a high acid ionomeric resin and the scope of the patent embraces all known high acid ionomeric resins falling within the parameters set forth above, only a relatively limited number of these high acid ionomeric resins are currently available. In this regard, the high acid ionomeric resins available from E. I. DuPont de Nemours Company under the trademark "Surlyn®", and the high acid ionomer resins available from Exxon Corporation under the trademark "Escor®" or tradename "Iotek" are examples of available high acid ionomeric resins which may be utilized in the present invention.

The high acid ionomeric resins available from Exxon under the designation "Escor®" and or "Iotek", are somewhat similar to the high acid ionomeric resins available under the "Surlyn®" trademark. However, since the Escors/Iotek ionomeric resins are sodium or zinc salts of poly (ethylene acrylic acid) and the "Surlyn®" resins are zinc, sodium, magnesium, etc. salts of poly(ethylene methacrylic acid), distinct differences in properties exist.

Examples of the high acid methacrylic acid based ionomers found suitable for use in accordance with this invention include Surlyn® AD-8422 (sodium cation), Surlyn® 8162 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid.

More particularly, Surlyn® AD-8422 is currently commercially available from DuPont in a number of different grades (i.e., AD-8422-2, AD-8422-3, AD-8422-5, etc.) based upon differences in melt index. According to DuPont, Surlyn® AD-8422 offers the following general properties when compared to Surlyn® 8920 the stiffest, hardest of all on the low acid grades (referred to as "hard" ionomers in U.S. Pat. No. 4,884,814), as shown in Table 4:

TABLE 4

| | LOW ACID (15 wt % Acid) | HIGH ACID (>20 wt % Acid) | |
|---|---|---|---|
| | SURLYN ® 8920 | SURLYN ® 8422-2 | SURLYN ® 8422-3 |
| IONOMER | | | |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP$^1$, ° C. | 88 | 86 | 85 |
| FP, ° C. | 47 | 48.5 | 45 |

TABLE 4-continued

|  | LOW ACID (15 wt % Acid) | HIGH ACID (>20 wt % Acid) | |
| --- | --- | --- | --- |
|  | SURLYN ® 8920 | SURLYN ® 8422-2 | SURLYN ® 8422-3 |
| COMPRESSION MOLDING[2] | | | |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

[1]DSC second heat, 10° C./min heating rate.
[2]Samples compression molded at 150° C. annealed 24 hours at 60° C. 8422-2, -3 were homogenized at 190° C. before molding.

In comparing Surlyn® 8920 to Surlyn®8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn® SEP-503-2 (magnesium cation) are high acid zinc and magnesium versions of the Surlyn® AD 8422 high acid ionomers. When compared to the Surlyn® AD 8422 high acid ionomers, the Surlyn SEP-503-1 and SEP-503-2 ionomers can be defined as follows, in Table 5:

TABLE 5

| Surlyn ® Ionomer | Ion | Melt Index | Neutralization % |
| --- | --- | --- | --- |
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation ionomer resin containing approximately 20% by weight (i.e. 18.5–21.5% weight) methacrylic acid copolymer that has been 30–70% neutralized. Surlyn® 8162 is currently commercially available from DuPont.

Examples of the high acid acrylic acid based ionomers suitable for use in the present invention include the Escor® or Iotek high acid ethylene acrylic acid ionomers produced by Exxon. In this regard, Escor® or Iotek 959 is a sodium ion neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are as follows, as in Table 6:

TABLE 6

| PROPERTY | ESCOR ® (IOTEK) 959 | ESCOR ® (IOTEK) 960 |
| --- | --- | --- |
| Melt Index, g/10 min | 2.0 | 1.8 |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

Furthermore, as a result of the development by the inventors of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce cover compositions exhibiting enhanced hardness and resilience due to synergies which occur during processing. Consequently, the metal cation neutralized high acid ionomer resins recently produced can be blended to produce substantially harder covered golf balls having higher C.O.R.'s than those produced by the low acid ionomer covers presently commercially available.

More particularly, several new metal cation neutralized high acid ionomer resins have been produced by the inventors by neutralizing, to various extents, high acid copolymers of an alpha-olefin and an alpha, beta-unsaturated carboxylic acid with a wide variety of different metal cation salts. This discovery is the subject matter of U.S. application Ser. No. 901,680, incorporated herein by reference. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Midland, Michigan, under the "Primacor" designation. These high acid base copolymers exhibit the typical properties set forth below in Table 7.

TABLE 7

Typical Properties of Primacor Ethylene-Acrylic Acid Copolymers

| GRADE ASTM | PERCENT ACID | DENSITY, g/cc D-792 | MELT INDEX, g/10 min D-1238 | TENSILE YD. ST (psi) D-638 | FLEXURAL MODULUS (psi) D-790 | VICAT SOFT PT (° C.) D-1525 | SHORE D HARDNESS D-2240 |
|---|---|---|---|---|---|---|---|
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1]The Melt Index values are obtained according to ASTM D-1238, at 190° C.

Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 8, more specifically in Example 1 in U.S. application Ser. No. 901,680, a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several new cation neutralized acrylic acid based high acid ionomer resins are produced.

TABLE 8

| Formulation No. | Wt-% Cation Salt | Wt-% Neutralization | Melt Index | C.O.R. | Shore D Hardness |
|---|---|---|---|---|---|
| 1(NaOH) | 6.98 | 67.5 | 0.9 | .804 | 71 |
| 2(NaOH) | 5.66 | 54.0 | 2.4 | .808 | 73 |
| 3(NaOH) | 3.84 | 35.9 | 12.2 | .812 | 69 |
| 4(NaOH) | 2.91 | 27.0 | 17.5 | .812 | (brittle) |
| 5(MnAc) | 19.6 | 71.7 | 7.5 | .809 | 73 |
| 6(MnAc) | 23.1 | 88.3 | 3.5 | .814 | 77 |
| 7(MnAc) | 15.3 | 53.0 | 7.5 | .810 | 72 |
| 8(MnAc) | 26.5 | 106 | 0.7 | .813 | (brittle) |
| 9(LiOH) | 4.54 | 71.3 | 0.6 | .810 | 74 |
| 10(LiOH) | 3.38 | 52.5 | 4.2 | .818 | 72 |
| 11(LiOH) | 2.34 | 35.9 | 18.6 | .815 | 72 |
| 12(KOH) | 5.30 | 36.0 | 19.3 | Broke | 70 |
| 13(KOH) | 8.26 | 57.9 | 7.18 | .804 | 70 |
| 14(KOH) | 10.7 | 77.0 | 4.3 | .801 | 67 |
| 15(ZnAc) | 17.9 | 71.5 | 0.2 | .806 | 71 |
| 16(ZnAc) | 13.9 | 53.0 | 0.9 | .797 | 69 |
| 17(ZnAc) | 9.91 | 36.1 | 3.4 | .793 | 67 |
| 18(MgAc) | 17.4 | 70.7 | 2.8 | .814 | 74 |
| 19(MgAc) | 20.6 | 87.1 | 1.5 | .815 | 76 |
| 20(MgAc) | 13.8 | 53.8 | 4.1 | .814 | 74 |
| 21(CaAc) | 13.2 | 69.2 | 1.1 | .813 | 74 |
| 22(CaAc) | 7.12 | 34.9 | 10.1 | .808 | 70 |

Controls:
50/50 Blend of Ioteks 8000/7030 C.O.R. = .810/65 Shore D Hardness
DuPont High Acid Surlyn ® 8422 (Na) C.O.R. = .811/70

TABLE 8-continued

| Formulation No. | Wt-% Cation Salt | Wt-% Neutralization | Melt Index | C.O.R. | Shore D Hardness |
|---|---|---|---|---|---|
| Shore D Hardness | | | | | |
| DuPont High Acid Surlyn ® 8162 (Zn) C.O.R. = .807/65 | | | | | |
| Shore D Hardness | | | | | |
| Exxon High Acid Iotek EX-960 (Zn) C.O.R. = .796/65 Shore D Hardness | | | | | |
| 23(MgO) | 2.91 | 53.5 | 2.5 | .813 | |
| 24(MgO) | 3.85 | 71.5 | 2.8 | .808 | |
| 25(MgO) | 4.76 | 89.3 | 1.1 | .809 | |
| 26(MgO) | 1.96 | 35.7 | 7.5 | .815 | |
| Control for Formulations 23–26 is 50/50 Iotek 8000/7030, C.O.R. = .814, Formulation 26 C.O.R. was normalized to that control accordingly | | | | | |
| 27(NiAc) | 13.04 | 61.1 | 0.2 | .802 | 71 |
| 28(NiAc) | 10.71 | 48.9 | 0.5 | .799 | 72 |
| 29(NiAc) | 8.26 | 36.7 | 1.8 | .796 | 69 |
| 30(NiAc) | 5.66 | 24.4 | 7.5 | .786 | 64 |
| Control for Formulation Nos. 27–30 is 50/50 Iotek 8000/7030, C.O.R. = .807 | | | | | |

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in golf ball cover construction, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451, and the recently produced high acid blends disclosed in U.S. application Ser. No. 776,803. Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for golf ball production. By using these high acid ionomer resins harder, stiffer golf balls having higher C.O.R.s, and thus longer distance, can be obtained.

As will be further noted, other ionomer resins may be used in the cover compositions, such as low acid ionomer resins, so long as the molded cover produces a Shore D hardness of 65 or more. Properties of some of these low acid ionomer resins are provided in the following Table 9:

TABLE 9

Typical Properties of Low Acid Escor ® (Iotek) Ionomers

| Resin Properties | ASTM Method | Units | 4000 | 4010 | 8000 | 8020 |
|---|---|---|---|---|---|---|
| Cation type | | | zinc | zinc | sodium | sodium |
| sodium | | | | | | |
| Melt index | D-1238 | g/10 min. | 2.5 | 1.5 | 0.8 | 1.6 |
| Density | D-1505 | kg/m³ | 963 | 963 | 954 | 960 |
| Melting Point | D-3417 | ° C. | 90 | 90 | 90 | 87.5 |
| Crystallization Point | D-3417 | ° C. | 62 | 64 | 56 | 53 |
| Vicat Softening Point | D-1525 | ° C. | 62 | 63 | 61 | 64 |
| % Weight Acrylic Acid | | | 16 | — | 11 | — |
| % of Acid Groups Cation Neutralized | | | 30 | — | 40 | — |

TABLE 9-continued

Typical Properties of Low Acid Escor ® (Iotek) Ionomers

| Plaque Properties | ASTM Method | Units | 4000 | 4010 | 8000 | 8020 |
|---|---|---|---|---|---|---|
| (3 mm thick, compression molded) | | | | | | |
| Tensile at Break | D-638 | MPa | 24 | 26 | 36 | 31.5 |
| Yield point | D-638 | MPa | none | none | 21 | 21 |
| Elongation at break | D-638 | % | 395 | 420 | 350 | 410 |
| 1% Secant modulus | D-638 | MPa | 160 | 160 | 300 | 350 |
| Shore Hardness D | D-2240 | — | 55 | 55 | 61 | 58 |

| Resin Properties | ASTM Method | Units | 8030 | 7010 | 7020 | 7030 |
|---|---|---|---|---|---|---|
| Cation type | | | sodium | zinc | zinc | zinc |
| Melt Index | D-1238 | g/10 min. | 2.8 | 0.8 | 1.5 | 2.5 |
| Density | D-1505 | kg/m³ | 960 | 960 | 960 | 960 |
| Melting Point | D-3417 | ° C. | 87.5 | 90 | 90 | 90 |
| Crystallization Point | D-3417 | ° C. | 55 | — | — | — |
| Vicat Softening Point | D-1525 | ° C. | 67 | 60 | 63 | 62.5 |
| % Weight Acrylic Acid | | | — | — | — | — |
| % of Acid Groups Cation Neutralized | | | — | — | — | — |

| Plaque Properties | ASTM Method | Units | 8030 | 7010 | 7020 | 7030 |
|---|---|---|---|---|---|---|
| (3 mm thick, compression molded) | | | | | | |
| Tensile at Break | D-638 | MPa | 28 | 38 | 38 | 38 |
| Yield Point | D-638 | MPa | 23 | none | none | none |
| Elongation at Break | D-638 | % | 395 | 500 | 420 | 385 |
| 1% Secant modulus | D-638 | MPa | 390 | — | — | — |
| Shore Hardness D | D-2240 | — | 59 | 57 | 55 | 55 |

In addition to the above noted ionomers, compatible additive materials may also be added to produce the cover compositions of the present invention. These additive materials include dyes (for example, Ultramarine Blue sold by Whitaker, Clark, and Daniels of South Painsfield, N.J.), and pigments, i.e. white pigments such as titanium dioxide (for example Unitane 0-110) zinc oxide, and zinc sulfate, as well as fluorescent pigments. As indicated in U.S. Pat. No. 4,884,814, the amount of pigment and/or dye used in conjunction with the polymeric cover composition depends on the particular base ionomer mixture utilized and the particular pigment and/or dye utilized. The concentration of the pigment in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on the weight of the base ionomer mixture. The most preferred pigment for use in accordance with this invention is titanium dioxide.

Moreover, since there are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials which do not affect the basic novel characteristics of the composition of this invention. Among such materials are antioxidants (i.e. Santonox R), antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

Furthermore, optical brighteners, such as those disclosed in U.S. Pat. No. 4,679,795, may also be included in the cover composition of the invention. Examples of suitable opticalbrighteners which can be used in accordance with this invention are Uvitex OB as sold by the Ciba-Geigy Chemical Company, Ardsley, N.Y. Uvitex OB is thought to be 2,5-Bis(5-tert-butyl-2-benzoxazoly)thiophene. Examples of other optical brighteners suitable for use in accordance with this invention are as follows: Leucopure EGM as sold by Sandoz, East Hanover, N.J. 07936. Leucopure EGM is thought to be 7-(2n-naphthol(1,2-d)-triazol-2yl)-3phenylcoumarin. Phorwhite K-20G2 is sold by Mobay Chemical Corporation, P.O. Box 385, Union Metro Park, Union, N.J. 07083, and is thought to be a pyrazoline derivative, Eastobrite OB-1 as sold by Eastman Chemical Products, Inc. Kingsport, Tenn., is thought to be 4,4-Bis(-benzoxaczoly) stilbene. The above-mentioned Uvitex and Eastobrite OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.10% to about 0.020% depending on the optical properties of the particular optical brightener used and the polymeric environment in which it is a part.

Generally, the additives are admixed with a ionomer to be used in the cover composition to provide a masterbatch (M.B.) of desired concentration and an amount of the masterbatch sufficient to provide the desired amounts of additive is then admixed with the copolymer blends.

The above cover compositions, when processed according to the parameters set forth below and combined with soft cores at thicknesses defined herein to produce covers having a Shore D hardness of 65, provide golf balls with reduced spin rates. It is noted, however, that the high acid ionomer resins provide for more significant reduction in spin rate than that observed for the low acid ionomer resins.

The cover compositions and molded balls of the present invention may be produced according to conventional melt blending procedures. In this regard, the ionomeric resins are blended along with the masterbatch containing the desired additives in a Banbury type mixer, two-roll mill, or extruded prior to molding. The blended composition is then formed into slabs or pellets, etc. and maintained in such a state until molding is desired. Alternatively a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process.

Moreover, golf balls of the present invention can be produced by molding processes currently well known in the golf ball art. Specifically, the golf balls can be produced by injection molding or compression molding the novel cover compositions about the soft cores to produce a golf ball having a diameter of about 1.680 inches or greater and weighing about 1.620 ounces. In an additional embodiment of the invention, larger molds are utilized to produce the thicker covered oversized golf balls.

As indicated, the golf balls of the present invention can be produced by forming covers consisting of the compositions of the invention around the cores by conventional molding processes. For example, in compression molding, the cover composition is formed via injection at about 380°F. to about 450° F. into smooth surfaced hemispherical shells which are then positioned around the core in a dimpled golf ball mold and subjected to compression molding at 200–300° F. for 2–10 minutes, followed by cooling at 50–70° F. for 2–10 minutes, to fuse the shells together to form an unitary ball. In addition, the golf balls may be produced by injection molding, wherein the cover composition is injected directly around the core placed in the center of a golf ball mold for a period of time at a mold temperature of from 50° F. to about 100° F. After molding the golf balls produced may undergo various further finishing steps such as buffing, painting, and marking as disclosed in U.S. Pat. No. 4,911,451.

In an alternative embodiment, the resulting ball is larger than the standard 1.680 inch golf ball. Its diameter is in the range of about 1.680 to 1.800 inches, more likely in the range of about 1.700 to 1.800 inches, preferably in the range of 1.710–1.730 inches, and most preferably in the range of about 1.717–1.720 inches. The larger diameter of the golf ball results from the cover thickness which ranges from more than the standard 0.0675 inches up to about 0.130, preferably from about 0.0675 to about 0.1275 inches, more preferably in the range of about 0.0825 to 0.0925, and most preferably in the range of about 0.0860 to 0.0890 inches. The core is of a standard size, roughly about 1.540 to 1.545 inches.

The invention has been described with reference to the preferred embodiment. Obviously, modifications and alterations will occur to others upon a reading and understanding of the preceding detailed description. It is intended that the invention be construed as including all such alterations and modifications insofar as they come within the scope of the appended claims or the equivalents thereof.

Having thus described the invention, it is claimed:

1. A method for forming a golf ball having a core that includes a cellular center component about which is disposed a metal mantle layer, said method comprising:

providing a spherical cellular center component;

forming a layer of a polymeric material about said cellular center component;

forming a metal mantle layer on said layer of polymeric material to form a core, wherein said metal mantle layer is formed about said polymeric component by an operation selected from the group consisting of electroplating, thermal spray coating, chemical vapor deposition, vacuum coating, sputtering, and ion plating; and forming a polymeric cover layer on said metal mantle layer to thereby form said golf ball.

2. The method of claim 1 wherein said metal mantle layer is formed on said polymeric layer by electroplating.

3. The method of claim 1 wherein said metal mantle layer is formed on said polymeric layer by a thermal spray coating technique.

4. The method of claim 1 wherein said metal mantle layer is formed on said polymeric layer by chemical vapor deposition.

5. The method of claim 1 wherein said metal mantle layer is formed on said polymeric layer by vacuum coating.

6. The method of claim 1 wherein said metal mantle layer is formed on said polymeric layer by sputtering.

7. The method of claim 1 wherein said metal mantle layer is formed on said polymeric layer by ion plating.

8. The method of claim 1 wherein said polymeric cover layer is formed on said mantle layer by an injection molding operation.

9. The method of claim 1 wherein said polymeric cover layer is formed on said mantle layer by a compression molding operation.

10. A method of forming a golf ball having a core comprising a cellular center component, a polymeric intermediate layer, and a metal mantle layer, said method comprising:

providing a hollow, spherical polymeric component defining an interior cavity;

introducing a flowable cellular material or cellular core material precursor into the interior cavity of said polymeric component;

forming a metal mantle layer about said polymeric component, wherein said metal mantle layer is formed about said polymeric component by an operation selected from the group consisting of electroplating, thermal spray coating, chemical vapor deposition, vacuum coating, sputtering, and ion plating;

forming a polymeric cover layer about said mantle to thereby form said golf ball.

11. The method of claim 10 wherein said introducing step is performed by injecting a cellular core material precursor and a blowing agent into the interior cavity of said polymeric component and foaming said material in the interior cavity of said polymeric component.

12. The method of claim 10 wherein said polymeric cover layer is formed about said metal mantle layer by injection molding.

13. The method of claim 10 wherein said polymeric cover layer is formed about said metal mantle layer by compression molding.

14. A method of forming a golf ball having a liquid core, said method comprising:

providing a hollow, spherical polymeric component defining an interior cavity;

introducing a liquid into the interior cavity of said polymeric component;

forming a metal mantle layer about said polymeric component, wherein said metal mantle layer is formed about said polymeric component by a technique selected from the group consisting of electroplating, thermal spray coating, chemical vapor deposition, vacuum coating, sputtering, and ion plating; and forming a polymeric cover layer about said mantle to thereby form said golf ball.

15. The method of claim 14 wherein said liquid is selected from the group consisting of water, alcohol, oil, and combinations thereof.

16. The method of claim 14 wherein said polymeric cover is formed about said metal mantle layer by injection molding.

17. The method of claim 14 wherein said polymeric cover is formed about said metal mantle layer by compression molding.

* * * * *

UNITED STATES PATENT AND TRADEMARK OFFICE
CERTIFICATE OF CORRECTION

PATENT NO.     : 6,561,927 B1
DATED          : May 13, 2003
INVENTOR(S)    : Michael J. Sullivan and R. Dennis Nesbitt It is certified that error appears in the above-identified patent and that said Letters Patent is hereby corrected as shown below:

<u>Title page,</u>
Item [63], Related U.S. Application Data, should be corrected as follows:
    "Continuation of application No. 09/248,856, filed on Feb. 11, 1999, now Pat. No. 6,193,618, and a continuation-in-part of application No. 08/969,083, filed on Nov. 12, 1997, now Pat. No. 6,244,977, which is a continuation-in-part of application No. 08/716,016, filed on Sep. 19, 1996, now Pat. No. 5,820,489 and a continuation-in-part of application No. 08/714,661, filed on Sep. 16, 1996, now Pat. No. 6,368,237, which is a division of application No. 08/255,442, filed on Jun. 8, 1994, now abandoned, which is a continuation of application No. 08/054,406, filed on Apr. 28, 1993, now Pat. No. 5,368,304." should read
    -- Continuation of application No. 09/248,856, filed on Feb. 11, 1999, now Pat. No. 6,193,618, which is a continuation-in-part of application No. 08/716,016, filed on Sep. 19, 1996, now Pat. No. 5,820,489, which is a division of application No. 08/255,442, filed on Jun. 8, 1994, now abandoned, which is a continuation of application No. 08/054,406, filed on Apr. 28, 1993, now Pat. No. 5,368,304, and a continuation-in-part of 08/969,083 filed on Nov. 12, 1997, now Pat. No. 6,244,977, and a continuation of 08/714,661, filed on Sep. 16, 1996, now Pat. No. 6,368,237. --

Signed and Sealed this

Second Day of September, 2003

JAMES E. ROGAN
*Director of the United States Patent and Trademark Office*